(12) United States Patent
Yamamoto

(10) Patent No.: US 11,453,266 B2
(45) Date of Patent: Sep. 27, 2022

(54) AIR-CONDITIONING DEVICE FOR VEHICLE

(71) Applicant: DENSO CORPORATION, Kariya (JP)

(72) Inventor: Masakazu Yamamoto, Kariya (JP)

(73) Assignee: DENSO CORPORATION, Kariya (JP)

( * ) Notice: Subject to any disclaimer, the term of this patent is extended or adjusted under 35 U.S.C. 154(b) by 52 days.

(21) Appl. No.: 17/082,880

(22) Filed: Oct. 28, 2020

(65) Prior Publication Data

US 2021/0061062 A1 Mar. 4, 2021

Related U.S. Application Data

(63) Continuation of application No. PCT/JP2019/015147, filed on Apr. 5, 2019.

(30) Foreign Application Priority Data

May 10, 2018 (JP) .............................. JP2018-091387

(51) Int. Cl.
*B60H 1/00* (2006.01)

(52) U.S. Cl.
CPC ................................ *B60H 1/00671* (2013.01)

(58) Field of Classification Search
CPC ............ B60H 1/00671; B60H 1/00835; B60H 1/00842; B60H 1/00874; B60H 1/00064; B60H 2001/00092; B60H 2001/00135; B60H 2001/00164; B60H 2001/00192
See application file for complete search history.

(56) References Cited

U.S. PATENT DOCUMENTS

| 6,253,841 B1* | 7/2001 | Obara | B60H 1/00849 454/145 |
| 7,464,749 B2* | 12/2008 | Okumura | B60H 1/00064 165/204 |
| 9,180,751 B2* | 11/2015 | Han | B60H 1/00692 |
| 10,081,225 B2* | 9/2018 | Kang | B60H 1/00064 |
| 10,144,265 B2* | 12/2018 | Kuwayama | B60H 1/00028 |
| 2014/0087646 A1 | 3/2014 | Kitamura et al. | |

FOREIGN PATENT DOCUMENTS

| JP | 2004345377 A | 12/2004 |
| JP | 2005022612 A | 1/2005 |
| JP | 2005022614 A | 1/2005 |
| JP | 2009149126 A | 7/2009 |
| JP | 2014061826 A | 4/2014 |
| JP | 2018047711 A | 3/2018 |

* cited by examiner

*Primary Examiner* — Marc E Norman
(74) *Attorney, Agent, or Firm* — Harness, Dickey & Pierce, P.L.C.

(57) ABSTRACT

An air-conditioning device for vehicle has a case and an outlet unit. The outlet unit has a vent door. The vent door is capable of stopping at a face mode position where a center vent outlet and a side vent outlet are opened, a bi-level mode position where a center vent outlet and the side vent outlet are opened, and a heat mode position where the center vent outlet is closed and the side vent outlet is opened. The vent door is movable from the face mode position to the heat mode position via the bi-level mode position. The case has a fixed guide member. The fixed guide member controls an air flow in the case in the bi-level position by facing the vent door positioned in the bi-level mode position.

10 Claims, 9 Drawing Sheets

| MODE | CENTER-VENT 21, 22 | SIDE-VENT 23, 24 | FOOT 25 | DEFROST 26 |
|---|---|---|---|---|
| FACE | ○ | ○ | — | — |
| B/L | ○ | ○ | ○ | — |
| HEAT | — | △ | ○ | △ |
| DEF | — | — | — | ○ |

FACE-MODE

FACE-MODE

FACE-MODE

HEAT-MODE

HEAT-MODE

B/L-MODE

B/L-MODE

DEFROST-MODE

DEFROST-MODE

DEFROST-MODE

AIR-CONDITIONING DEVICE FOR VEHICLE

CROSS-REFERENCE TO RELATED APPLICATIONS

The present application is a continuation application of International Patent Application No. PCT/JP2019/015147 filed on Apr. 5, 2019, which designated the U.S. and claims the benefit of priority from Japanese Patent Application No. 2018-091387 filed in Japan filed on May 10, 2018, the entire disclosure of the above application is incorporated herein by reference.

TECHNICAL FIELD

The disclosure in this specification relates to an air-conditioning device for vehicle.

BACKGROUND

An air-conditioning device includes a plurality of outlets. This device creates a predetermined temperature difference between a temperature of air blown from an outlet in an upper part of a compartment and a temperature of air blown from an outlet in a lower part of the compartment. Such a blowout mode is called a bi-level mode in the air-conditioning device for vehicle.

SUMMARY

The air-conditioning device have been improved in order to achieve a given air temperature. On the other hand, the air-conditioning device may be required to suppress a temperature difference between a plurality of outlets. For example, in one blowing mode, when air blows out from a plurality of outlets located in an upper part of a compartment, it is desirable that a temperature difference between them is small. However, in other blowing modes, it may be required to blow warm or cool air from only some of the plurality of outlets. In the aforementioned viewpoint, or in other viewpoint that has not been described, further improvement is demanded for an air-conditioning device for vehicle.

An air-conditioning device for vehicle disclosed herein comprising: a case which provides a center vent outlet for supplying air to an upper center of a compartment to be air-conditioned, a side vent outlet for supplying air to a left and right side portions of the compartment, and a foot outlet for supplying air to a lower part of the compartment; a temperature adjusting unit including a cooling heat exchanger and a heating heat exchanger for adjusting a temperature of the air supplied from the case to the compartment; an outlet unit providing a plurality of modes by adjusting opening degrees of the center vent outlet, the side vent outlet, and the foot outlet; and a control device which controls the outlet unit, wherein the outlet unit includes a vent door which is capable of stopping at a face mode position where the center vent outlet and the side vent outlet are opened, a bi-level mode position where the center vent outlet and the side vent outlet are opened, and a heat mode position where the center vent outlet is closed and the side vent outlet is open, and is capable of moving over between the face mode position and the heat mode position through the bi-level mode position, and wherein the case has a fixed guide member which controls an air flow in the case in the bi-level mode position so as to suppress a difference between a temperature of air supplied from the center vent outlet and a temperature of air supplied from the side vent outlet by opposing to the vent door positioned at the bi-level mode position.

According to the disclosed air-conditioning device for vehicle, the vent door is capable of stopping at each of the face mode position, the heat mode position, and the bi-level mode position. In the heat mode, the air-conditioning device closes the center vent outlet and opens the side vent outlet. As a result, the side vent outlet is provided with warm air suitable for left and right side windows. The case, the vent door, and the like are designed and formed to supply a relatively high-temperature warm air suitable for the side vent outlet. On the other hand, in the bi-level mode, the air-conditioning device opens the center vent outlet and the side vent outlet. At this time, the vent door is positioned at the bi-level position facing the fixed guide member. Therefore, the fixed guide member controls the air flow in the case together with the vent door so as to suppress the difference between the temperature of the air supplied from the center vent outlet and the temperature of the air supplied from the side vent outlet. The fixed guide member controls the air flow in the case only in the bi-level mode so as to resist a characteristic in the heat mode in which the temperature of the air supplied from the side vent outlet is adjusted to be high. As a result, in the bi-level mode, the temperature difference between the air temperature from the center vent outlet and the air temperature from the side vent outlet is suppressed.

The disclosed aspects in this specification adopt different technical solutions from each other in order to achieve their respective objectives. Reference numerals in parentheses described in claims and this section exemplarily show corresponding relationships with parts of embodiments to be described later and are not intended to limit technical scopes. The objects, features, and advantages disclosed in this specification will become apparent by referring to following detailed descriptions and accompanying drawings.

DESCRIPTION OF EMBODIMENT

Figures 1, 2:
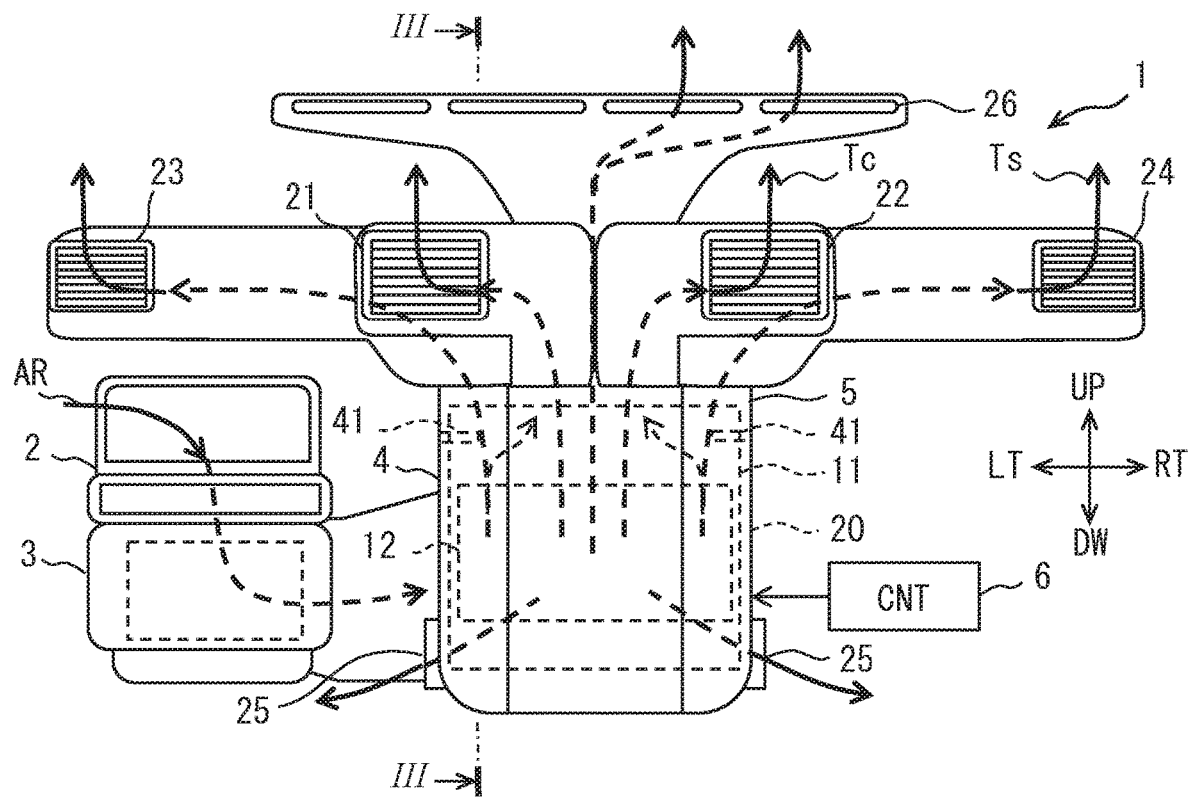
FIG. 1 is a block diagram of an air conditioner according to a first embodiment.
FIG. 2 is a comparison table showing outlets in a plurality of outlet modes.

A plurality of embodiments will be described with reference to the drawings. In some embodiments, parts which are functionally and/or structurally corresponding and/or associated are given the same reference numerals, or reference numerals with different hundreds digit or higher digits. For corresponding parts and/or associated parts, reference can be made to the description of other embodiments.

First Embodiment

In FIG. 1, the air-conditioning device 1 is mounted on a vehicle. The air-conditioning device 1 is mounted, for example, in front of a front seat of the vehicle. The air-conditioning device 1 adjusts an air temperature of a compartment to be air-conditioned. In the drawing, an upward direction UP, a downward direction DW, a left direction LT, a right direction RT, a front direction FR, and a rear direction RR of the vehicle are illustrated. The front direction FR and the rear direction RR indicate a depth direction. The left direction LT and the right direction RT indicate a width direction. The downward direction DW indicates the gravity direction. The air-conditioning device 1 may be mounted on various positions such as a rear part and a ceiling part of the vehicle. The air-conditioning device 1 may be used for various purposes. One application is an air-conditioning device for vehicle, including a car. The air-conditioning device 1 provides air conditioning for a passenger compartment of the vehicle. Here, the term vehicle should be interpreted in a broad sense, and includes moving objects such as cars, ships, and aircrafts, and fixed objects such as amusement equipment and simulation equipment.

The air-conditioning device 1 has an recirculation/fresh unit 2, a blower unit 3, a temperature adjusting unit 4, and an outlet unit 5. The air-conditioning device 1 has a case 20 for defining an air flow. The case 20 has a plurality of partial cases that provide the recirculation/fresh unit 2, the blower unit 3, the temperature adjusting unit 4, and the outlet unit 5, respectively. The case 20 forms a passage through which air for air conditioning flows. The case 20 houses one or more heat exchangers and functional components such as one or more flow control doors.

For example, the temperature adjusting unit 4 includes a cooling heat exchanger 11 and a heating heat exchanger 12 that adjust a temperature of the air supplied from the case 20 to the compartment. The cooling heat exchanger 11 cools the air passing through. The heating heat exchanger 12 heats the air passing through. The cooling heat exchanger 11 is provided by an evaporator of a vapor compression refrigeration cycle. The cooling heat exchanger 11 may be provided by various refrigeration cycles such as an adsorption refrigeration cycle, a magneto-thermal effect refrigeration cycle, and a thermoelectric effect refrigeration cycle. The heating heat exchanger 12 is provided by a radiator that radiates a waste heat of the vehicle. The heating heat exchanger 12 may be provided by a condenser of a vapor compression refrigeration cycle. The heating heat exchanger 12 may be provided by various heat pump cycles such as a Joule heat type radiator, an adsorption type refrigeration cycle, a magneto-thermal effect type refrigeration cycle, a thermoelectric effect type refrigeration cycle, and the like. Further, the heating heat exchanger 12 may include an electric air heater having an electric heater as a heat source. As the electric heater, for example, a PTC (Positive Temperature Coefficient) heater may be used.

A typical flow of air AR is illustrated by arrows. The air AR enters from the recirculation/fresh unit 2, passes through the blower unit 3, and further passes through the temperature adjusting unit 4. The air AR passes through the cooling heat exchanger 11 and/or the heating heat exchanger 12 in the temperature adjusting unit 4 to be temperature adjusted. The air AR enters the outlet unit 5 from the temperature adjusting unit 4 and branches into a plurality of outlets. The temperature adjusted air AR is blown toward the compartment from a plurality of air outlets. This provides air conditioning. The plurality of outlets include vent outlets 21, 22, 23, and 24, a foot outlet 25, and a defrost outlet 26. The outlet unit 5 provides a plurality of modes by adjusting an opening degrees of the center vent outlets 21 and 22, the side vent outlets 23 and 24, and the foot outlet 25. Further, the outlet unit 5 provides the defrost mode by adjusting the opening degree of the defrost outlet 26.

The vent outlets 21, 22, 23, and 24 are open at an upper part of the vehicle compartment. The vent outlets 21, 22, 23, and 24 supply air to the upper part of the compartment, that is, supply air to an upper body of an occupant. The vent outlets 21, 22, 23, and 24 include center vent outlets 21 and 22 and side vent outlets 23 and 24. The center vent outlets 21 and 22 are opened in a center part of the compartment. The side vent outlets 23, 24 open near windows of the compartment typically near side window glasses. The side vent outlets 23 and 24 supply air to a left and right sides of the compartment. The vent outlets 21, 22, 23, and 24 are also called upper outlets, cooling outlets, or face outlets. The vent outlets 21 and 23 are arranged on the left area of the compartment. The vent outlets 22 and 24 are arranged on the right area of the compartment.

The foot outlet 25 opens at a bottom of the compartment. The foot outlet 25 supplies air to a lower part of the compartment, that is, supplies air to a lower half of an occupant. The foot outlet 25 is also called a lower outlet, a heating outlet, or a heat outlet.

The defrost outlet 26 is open toward an inner surface of the windshield in front of the vehicle. The defrost outlet 26 blows air on the inner surface of the windshield. The defrost outlet 26 is an outlet for preventing fogging and removing fogging. The defrost outlet 26 is also called a window outlet, a warm air outlet, or a def outlet.

The plurality of outlets may include additional outlets. The plurality of air outlets may have, for example, an air outlet toward a rear seat of the vehicle or an air outlet for a passenger's seat.

The air-conditioning device 1 includes a control device (CNT) 6. The control device 6 is an electronic control unit (Electronic Control Unit). The control device 6 provides a control system for the air-conditioning device 1. The control system has at least one arithmetic processing unit (CPU) and at least one memory device (MMR) as a storage medium for storing programs and data. The control system is provided by a microcomputer comprising a computer readable storage medium. The storage medium is a non-transitional tangible storage medium that temporarily stores a computer readable program. The storage medium may be provided as a semiconductor memory, a magnetic disk, or the like. The control system may be provided by one computer or a group of computer resources linked via a data communication device. The program is executed by the control system to cause the control system to function as a device described in the present specification and to cause the control system to function to perform the methods described in the present specification.

Means and/or functions provided by the control system can be provided by software recorded in a substantive memory device and a computer that can execute the software, software only, hardware only, or some combination of them. For example, the control system may be provided by a logic called if-then-else type, or a neural network tuned by machine learning. Alternatively, for example, if the control system is provided by an electronic circuit that is hardware, the control system may be provided by a digital circuit or an analog circuit that includes a large number of logic circuits.

In FIG. 2, a usage relationship of the plurality of outlets 21, 22, 23, 24, 25, and 26 in the plurality of blowing modes (MODE) is shown. A plurality of blowing modes include a face mode (FACE), a bi-level mode (B/L), a heat mode (HEAT), and a defrost mode (DEF). The plurality of blowing modes may further include an additional intermediate mode. A circle symbol indicates that a large amount of air flows. A triangle symbol indicates that a small amount of air flows compared to the other modes of the circle symbol. The plurality of outlets 21, 22, 23, 24, 25, and 26 are used in a unique combination in each of the plurality of blowing modes.

In the face mode, the center vent outlets 21 and 22 (CENTER-VENT) and the side vent outlets 23 and 24 (SIDE-VENT) are used. In the face mode, the center vent outlets 21 and 22 and the side vent outlets 23 and 24 are used to supply air having a relatively low temperature with respect to the compartment temperature.

In the heat mode, the foot outlet 25 (FOOT) is mainly used. In the heat mode, the air AR is also supplied to the side vent outlets 23 and 24 and the defrost outlet 26 (DEFROST). However, in the heat mode, the air volume of the side vent outlets 23 and 24 and the air volume of the defrost outlet 26 are clearly and distinctly smaller than the air volume of the foot outlet 25. In the heat mode, the side vent outlets 23 and 24 and the defrost outlet 26 are used to supply relatively hot air so as to suppress fogging of the window. In the heat mode, the foot outlet 25 is used to supply air having a relatively high temperature with respect to the compartment temperature.

In the bi-level mode, the vent outlets 21, 22, 23, and 24 and the foot outlet 25 are used. In the bi-level mode, the vent outlets 21, 22, 23, and 24 are used to supply air having a relatively low temperature with respect to the air supplied from the foot outlet 25. The foot outlet 25 is used to supply relatively high temperature air to the air supplied from the vent outlets 21, 22, 23, 24.

In the defrost mode, the defrost outlet 26 is used.

There are two main reasons why the side vent outlets 23 and 24 are used in the heat mode. One is to prevent fogging of the side window glasses and to remove the fogging of the side window glasses. The other is to block cool air from the wall of the compartment in the heat mode, in other words, reduce heat radiation to the wall of the compartment. Therefore, in the heat mode, the side vent outlets 23 and 24 are required to be supplied with air having a relatively high temperature as compared with other modes. In order to meet this demand, the temperature adjusting unit 4 and the outlet unit 5 are tuned so as to supply hot air to the side vent outlets 23 and 24 in the heat mode. This tuning is performed by the shape of the case 20 of the temperature adjusting unit 4 and the outlet unit 5, and/or a setting of an opening degree of the door.

However, a tuning for supplying high temperature air to the side vent outlets 23 and 24 in the heat mode also changes a temperature of the side vent outlets 23 and 24 in the other outlet modes. For example, the above tuning causes the temperature of the side vent outlets 23 and 24 to rise in a plurality of blowing modes. When air is supplied from both the center vent outlets 21 and 22 and the side vent outlets 23 and 24, a large temperature difference may occur between them. This temperature difference is particularly remarkable in the bi-level mode. This temperature difference is also referred to as temperature variation in the plurality of vent outlets 21-24 in the bi-level mode. A small temperature variation may be required as one of the guidelines for comfortable air conditioning.

In this embodiment, the temperature rise of the air supplied from the side vent outlets 23 and 24 due to the above tuning for the heat mode is suppressed in the bi-level mode. In other words, the temperature rise of the air supplied from the side vent outlets 23 and 24 due to the above tuning for the heat mode is suppressed in the bi-level mode. Thereby, while it makes possible to enable supplying relatively high temperature air from the side vent outlets 23 and 24 in the heat mode, and it makes possible to enable suppressing a temperature variation on the center vent outlets 21 and 22 and the side vent outlets 23 and 24 in the bi-level mode.

FIG. 3, FIG. 6, FIG. 9, and FIG. 13 are cross-sectional views taken along the line III-III in FIG. 1. The temperature adjusting unit 4 and the outlet unit 5 have a center unit and two side units arranged on both sides of the center unit. FIG. 3, FIG. 6, FIG. 9, and FIG. 13 show cross sections of the temperature adjusting unit 4 and the outlet unit 5 in the side unit.

The temperature adjusting unit 4 has one or more temperature adjusting mechanisms. The temperature adjusting mechanism includes air mix doors 18 and 19 as temperature adjusting members. The temperature adjusting mechanism includes a cool air passage and a warm air passage in which an air volume ratio is adjusted by the temperature adjusting member. The cool air passage and the warm air passage are arranged to receive the air that has passed through the cooling heat exchanger 11. The heating heat exchanger 12 is arranged so as to cross only the warm air passage. The definitions of the cool air and the warm air refer to a relatively low temperature air or a relatively high temperature air respectively. In many cases, the cool air refers to air that is cooler than the compartment temperature. In many cases, the warm air refers to air that is warmer than the compartment temperature. These terms are relative terms.

The temperature adjusting unit 4 has an upper unit arranged on the upper side and a lower unit arranged below the upper unit. The upper unit includes an upper cool air passage 14 for passing cool air that has passed through the cooling heat exchanger 11, and an upper warm air passage 15 for passing warm air that has passed through the cooling heat exchanger 11 and then passed through the heating heat exchanger 12. The lower unit includes a lower cool air passage 17 for passing cool air that has passed through the cooling heat exchanger 11, and a lower warm air passage 16 for passing warm air that has passed through the cooling heat exchanger 11 and then passed through the heating heat exchanger 12.

The lower warm air passage 16 may additionally include an electric heater 13 that electrically generates heat. The electric heater 13 is also called a PTC (Positive Temperature Coefficient) heater. The temperature adjusting unit 4 has an upper air mix door 18 and a lower air mix door 19. The upper air mix door 18 adjusts an air temperature by adjusting the air volume ratio between the upper cool air passage 14 and the upper warm air passage 15. The lower air mix door 19 adjusts an air temperature by adjusting the air volume ratio between the lower cool air passage 17 and the lower warm air passage 16. Positions of the upper air mix door 18 and the lower air mix door 19 are controlled by the control device 6.

The outlet unit 5 communicates with the plurality of outlets 21, 22, 23, 24, 25, and 26. The outlet unit 5 has vent connecting portions 21a, 22a, 23a, and 24a which are four series arranged rectangular openings. The vent connecting portions 21a, 22a, 23a, and 24a are connected to ducts communicating with the center vent outlet 21, the center vent outlet 22, the side vent outlet 23, and the side vent outlet 24, respectively. In addition, each of the connecting openings is connected to the corresponding outlet. Therefore, in the following description, the term "connecting opening" may mean an outlet.

The center vent outlets 21 and 22 and the side vent outlets 23 and 24 are arranged along the width direction (LT, RT) of the case 20. The side vent outlets 23 and 24 are located on both sides of the center vent outlets 21 and 22.

The outlet unit 5 has the foot outlet 25. The outlet unit 5 may include a foot connecting portion for connecting to a duct communicating with the foot outlet 25. The outlet unit 5 has a defrost connecting portion 26a. The defrost connecting portion 26a is connected to a duct that communicates with the defrost outlet 26.

The outlet unit 5 has a switching mechanism for adjusting the communication state with the plurality of outlets 21, 22, 23, 24, 25, and 26 according to the plurality of outlet modes. The switching mechanism provides the face mode, the heat mode, the bi-level mode, and the defrost mode described above. The switching mechanism is provided by a plurality of doors 31, 32, and 33. The plurality of doors 31, 32, and 33 are controlled by the control device 6. In the heat mode, the outlet unit 5 communicates the upper unit with the side vent outlets 23 and 24 and the lower unit with the foot outlet 25. The outlet unit 5 communicates the upper cool air passage 14 with the center vent outlets 21 and 22 and the side vent outlets 23 and 24 in the bi-level mode. In the bi-level mode, the outlet unit 5 communicates the upper warm air passage 15, the lower warm air passage 16, and the lower cool air passage 17 to the foot outlet 25. Further, a part of the air supplied to the foot outlet 25 is supplied to the center vent outlets 21 and 22 and the side vent outlets 23 and 24, along the wall surface of the case 20 through the fixed guide member 41, in the bi-level mode by the outlet unit 5.

The vent door 31 is a door for opening and closing the vent connecting portions 21a, 22a, 23a, and 24a. The vent door 31 opens the vent connecting portions 21a, 22a, 23a, and 24a in the vent mode. The vent door 31 closes the vent connecting portions 21a, 22a, 23a, and 24a in the heat mode and the defrost mode. The vent door is capable of stopping at the heat mode position and the defrost mode position. The vent door 31 provides an intermediate opening degree of the vent connecting portions 21a, 22a, 23a and 24a in the bi-level mode.

The vent door 31 is also a guide member for partitioning and forming an air passage in the case 20. That is, the vent door 31 provides a guide plate that partitions and forms an air passage in the case 20 when the vent connecting portions 21a, 22a, 23a, and 24a are at least partially opened. In particular, it provides a fixed guide plate that guides the air flow in the side unit from the side unit to the center unit in the bi-level mode position described later.

The case 20 has a box-shaped outer shape. The case 20 has a connecting openings to the center vent outlets 21 and 22 and the side vent outlets 23 and 24 on an upper part, and has a foot outlet 25 on a lower part. The vent door 31 is capable of stopping at a plurality of positions. The vent door 31 is capable of moving over between the face mode position and the heat mode position through the bi-level mode position. In the face mode position, the vent door 31 opens the center vent outlets 21 and 22 and the side vent outlets 23 and 24. In the bi-level mode position, the vent door 31 opens the center vent outlets 21 and 22 and the side vent outlets 23 and 24. In the heat mode, the vent door 31 closes the center vent outlets 21 and 22 and opens the side vent outlets 23 and 24.

The foot door 32 is a door for opening and closing the foot outlet 25. The foot door 32 opens the foot outlet 25 in the heat mode. The foot door 32 closes the foot outlet 25 in the vent mode. The foot door 32 provides an intermediate opening degree of the foot outlet 25 in the bi-level mode.

The foot door 32 is also a guide member for partitioning and forming an air passage in the case 20. In the heat mode, the foot door 32 allows the lower warm air passage 16 to directly communicate with the foot outlet 25, and shuts off the upper unit and the lower unit. The foot door 32 communicates both the upper warm air passage 15 and the lower warm air passage 16 with the foot outlet 25 in the bi-level mode. Further, the foot door 32 allows an upward air flow along the inner surface of the case 20 in the bi-level mode. At this time, the air passed through the upper warm air passage 15, the lower warm air passage 16, and the lower cool air passage 17 flows up through corners of the side units of the case 20.

The defrost door 33 is a door for opening and closing the defrost connecting portion 26a. The defrost door 33 opens the defrost connecting portion 26a in the defrost mode. The defrost door 33 closes the defrost connecting portion 26a in the vent mode and the bi-level mode. The defrost door 33 provides an intermediate opening degree of the defrost connecting portion 26a in the heat mode.

The case 20 has a fixed guide member 41. The fixed guide member 41 is formed on an inner surface of the case 20. The fixed guide member 41 is provided by a plate-shaped small piece protruding from the inner surface of the case 20 toward the inside of the case 20. The fixed guide member 41 is located at a corner between a front wall and a side wall of the case 20. The fixed guide member 41 is arranged at each of two corners in the width direction (LT, RT) of the case 20. The fixed guide member 41 is integrally formed with the case 20 by a continuous resin material. The fixed guide member 41 is formed on the two side units.

The fixed guide member 41 provides a lower surface facing the downward direction DW. The fixed guide member 41 provides a barrier surface for the air flow that flows in the case 20 from a bottom to a top. The fixed guide member 41 generates an air flow in the case 20 in the width direction. This barrier surface is also a guide surface for guiding the air flow inward. In the bi-level mode, the fixed guide member 41 directs the airflow flowing from the bottom to the top tilt inwardly in the lateral direction of the case 20. The fixed guide member 41 promotes mixing of air in the case 20 at the bi-level. The fixed guide member 41 promotes mixing of air toward the center vent outlets 21 and 22 in the case 20 and air toward the side vent outlets 23 and 24. The fixed guide member 41 suppresses the temperature difference between the plurality of vent outlets 21, 22, 23, and 24 in the bi-level mode. The fixed guide member 41 is a member for adjusting a temperature controllability of the air-conditioning device 1. The fixed guide member 41 is also called a temperature control guide plate or a bi-level guide plate.

The fixed guide member 41 cooperates with the vent door 31 to provide the guide surface. In particular, the fixed guide member 41 remarkably exhibits a function as a guide surface when the vent door 31 is in the bi-level mode position. A movable range R31 of the vent door 31 extends over between a position of the vent door 31 in the face mode and a position of the vent door 31 in the heat mode. The fixed guide member 41 is located radially outside the movable range R31. The fixed guide member 41 is located in a middle of the movable range R31 of the vent door 31. In other words, there is a bi-level mode position between the face mode position and the heat mode position of the vent door 31.

The position of the fixed guide member 41 is an extension of the plate-shaped portion of the vent door 31 in the bi-level mode. In the bi-level mode, the fixed guide member 41 is positioned to form a minute gap with respect to an outer peripheral edge of the plate-shaped portion of the vent door 31. The minute gap may be the smallest gap that may be allowed to implement the device.

However, in the face mode, in the heat mode, and in the bi-level mode, the fixed guide member 41 is far away from the plate-shaped portion of the vent door 31. Therefore, the fixed guide member 41 does not have a strong aerodynamic relationship with the vent door 31 in modes other than the bi-level.

The fixed guide member 41 exerts almost no function as the guide surface when the vent door 31 is in the face mode position, the heat mode position, and the defrost mode position. In other words, the fixed guide member 41 exerts almost no function as the guide surface when the vent door 31 is in a position other than the bi-level mode position.

The fixed guide member 41 faces the vent door 31 positioned at the bi-level mode position. The fixed guide member 41 controls the air flow in the case 20 at the bi-level position. The fixed guide member 41 controls the air flow so as to suppress the difference between the temperature of the air supplied from the center vent outlets 21 and 22 and the temperature of the air supplied from the side vent outlets 23 and 24.

FIG. 4, FIG. 7, FIG. 10, and FIG. 14 are front views of the case 20. In the drawings, the heating heat exchanger 12 inside the case 20, the vent door 31, and the fixed guide member 41 are illustrated. The vent door 31 is shown focusing on an edge associated with the fixed guide member 41.

FIG. 5, FIG. 8, FIG. 11, and FIG. 15 are perspective views showing the temperature adjusting unit 4 and the outlet unit 5. The plurality of vent connecting portions 21a, 22a, 23a, and 24a are opened on an upper surface of the case 20. Further, the defrost connecting portion 26a is also open on the upper surface of the case 20. The foot outlet 25 is open to the side surface of the case 20.

Figure 3:
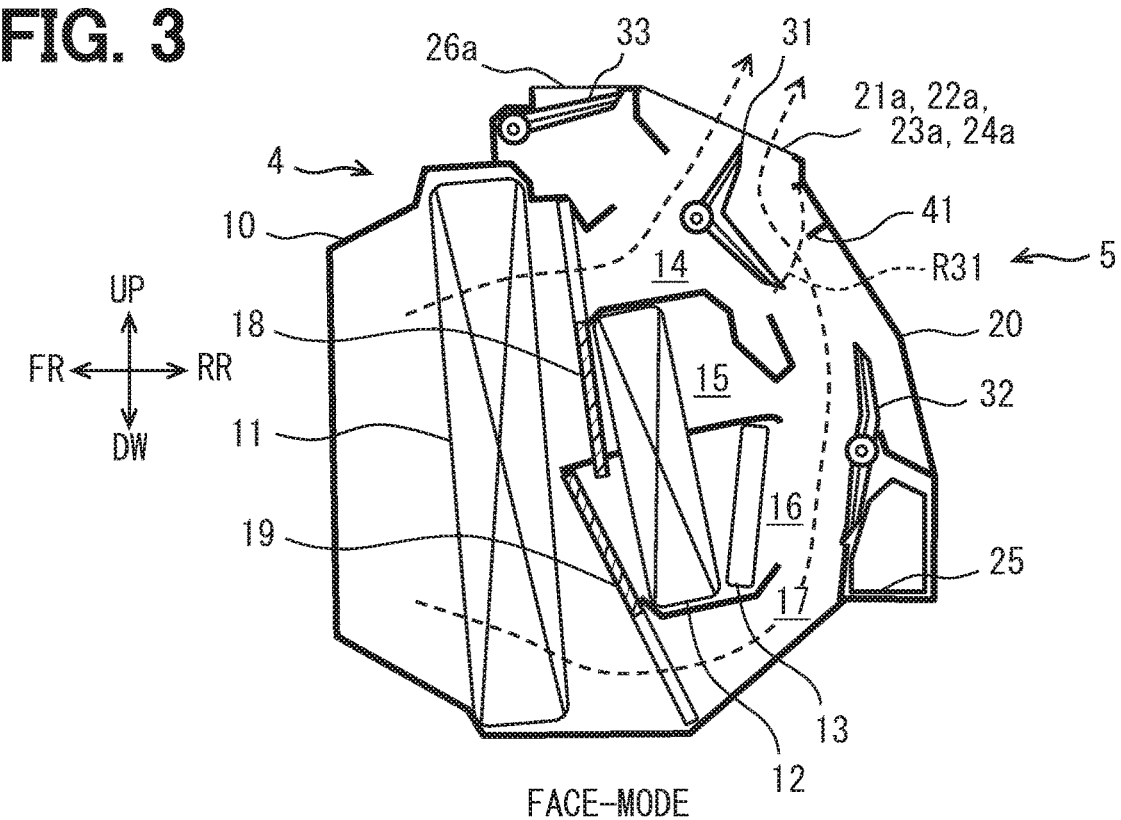
FIG. 3 is a cross-sectional view showing a face blowing mode.
Figure 4:
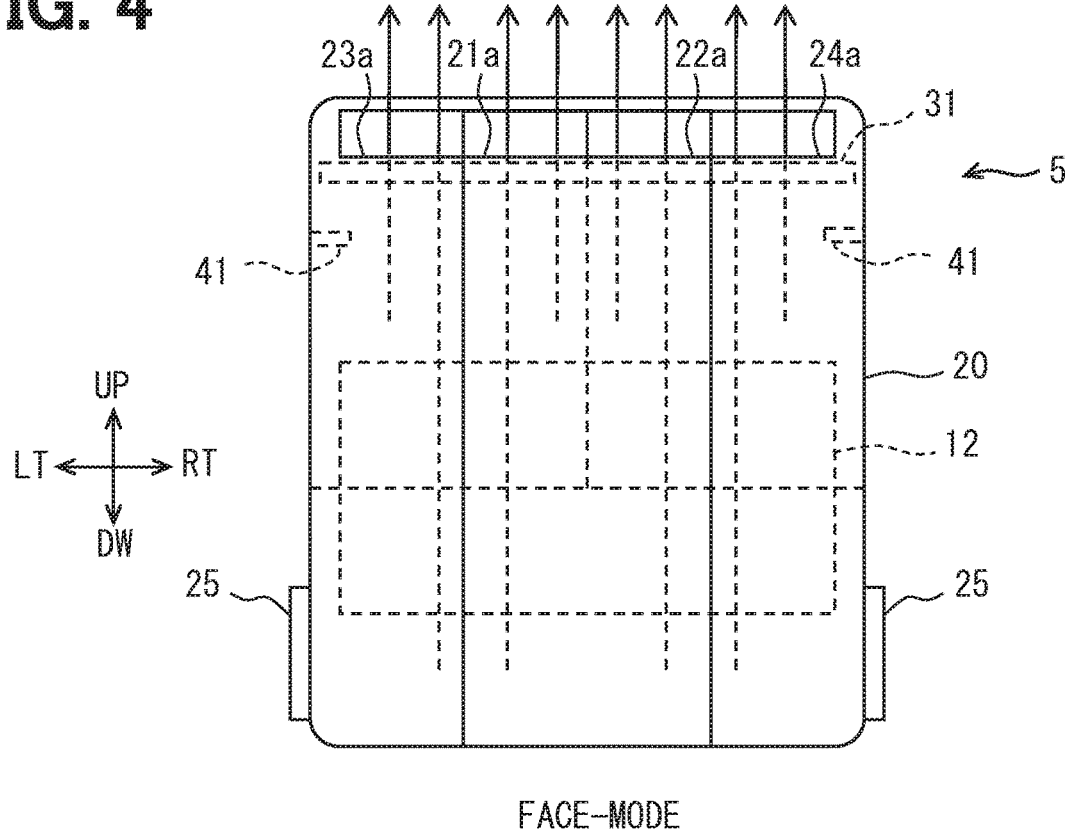
FIG. 4 is a front view showing the face blowing mode.
Figure 5:
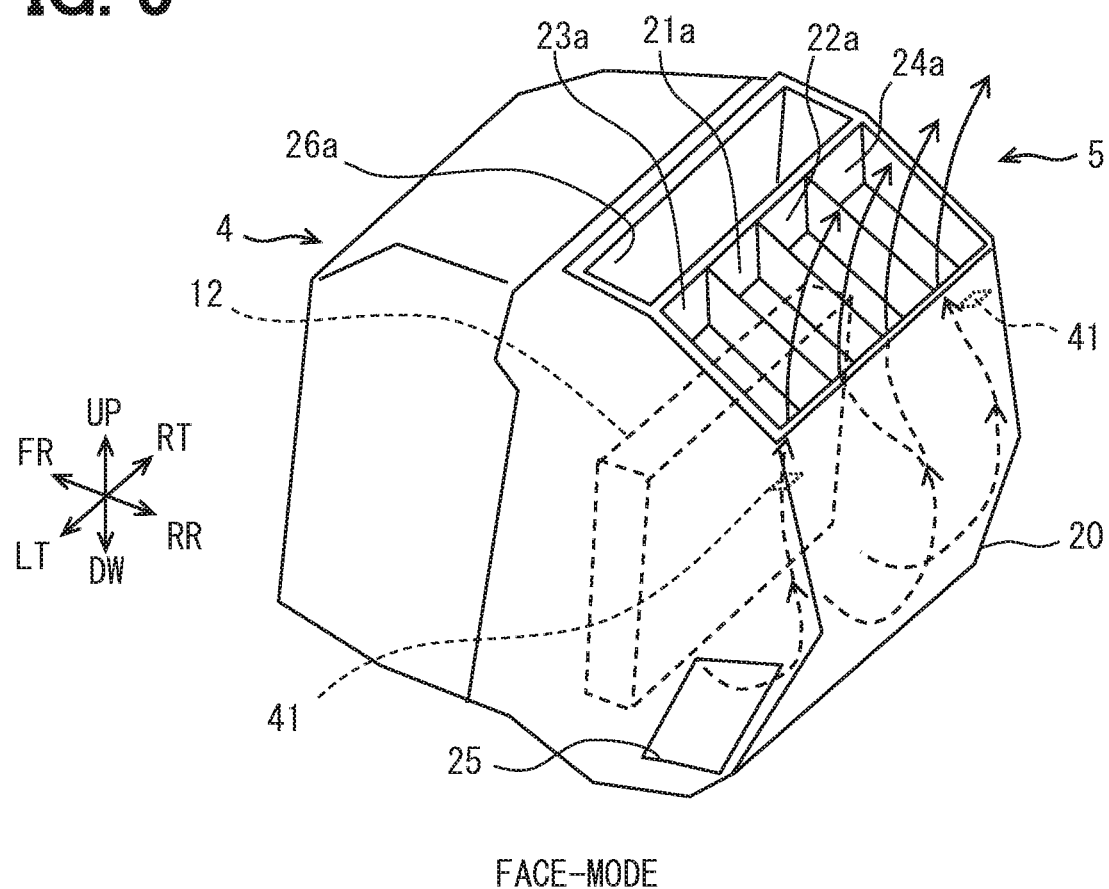
FIG. 5 is a perspective view showing the face blowing mode.

FIG. 3, FIG. 4, and FIG. 5 show the face mode. In these drawings, the air flow in the face mode is indicated by arrows. In the face mode, all the air flowing in the case 20 flows toward the vent connecting portions 21a, 22a, 23a, and 24a. The air passed through the upper unit is deflected slightly upward by the vent door 31 and flows toward the vent connecting portions 21a, 22a, 23a, and 24a. The air passed through the lower unit flows from the bottom to the top along the wall surfaces of the foot door 32 and the case 20, flows along the plate-shaped portion of the vent door 31, and flows toward the vent connecting portions 21a, 22a, 23a, and 24a. At this time, the vent door 31 and the fixed guide member 41 are distant from each other and generate almost no aerodynamic action. In the face mode, the air whose temperature is adjusted by the temperature adjusting mechanism is supplied to the compartment from the plurality of vent outlets 21, 22, 23, and 24.

Figure 6:
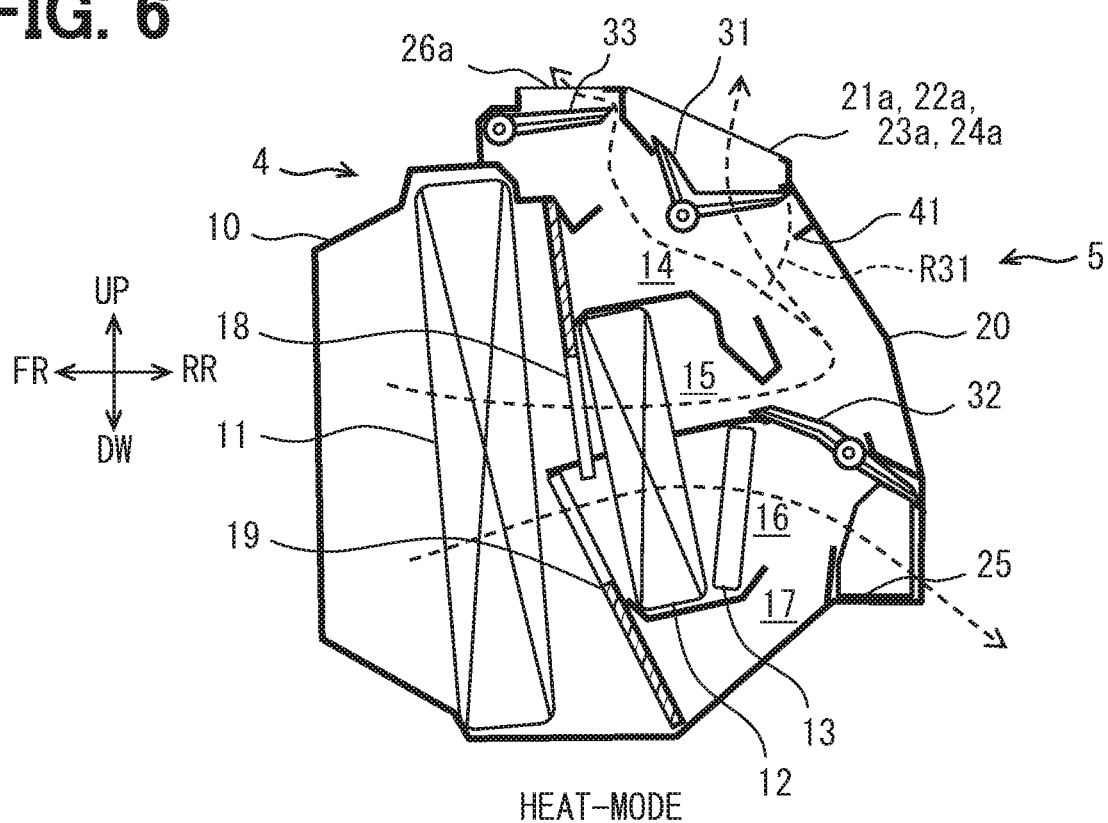
FIG. 6 is a cross-sectional view showing a heat blowing mode.
Figure 7:
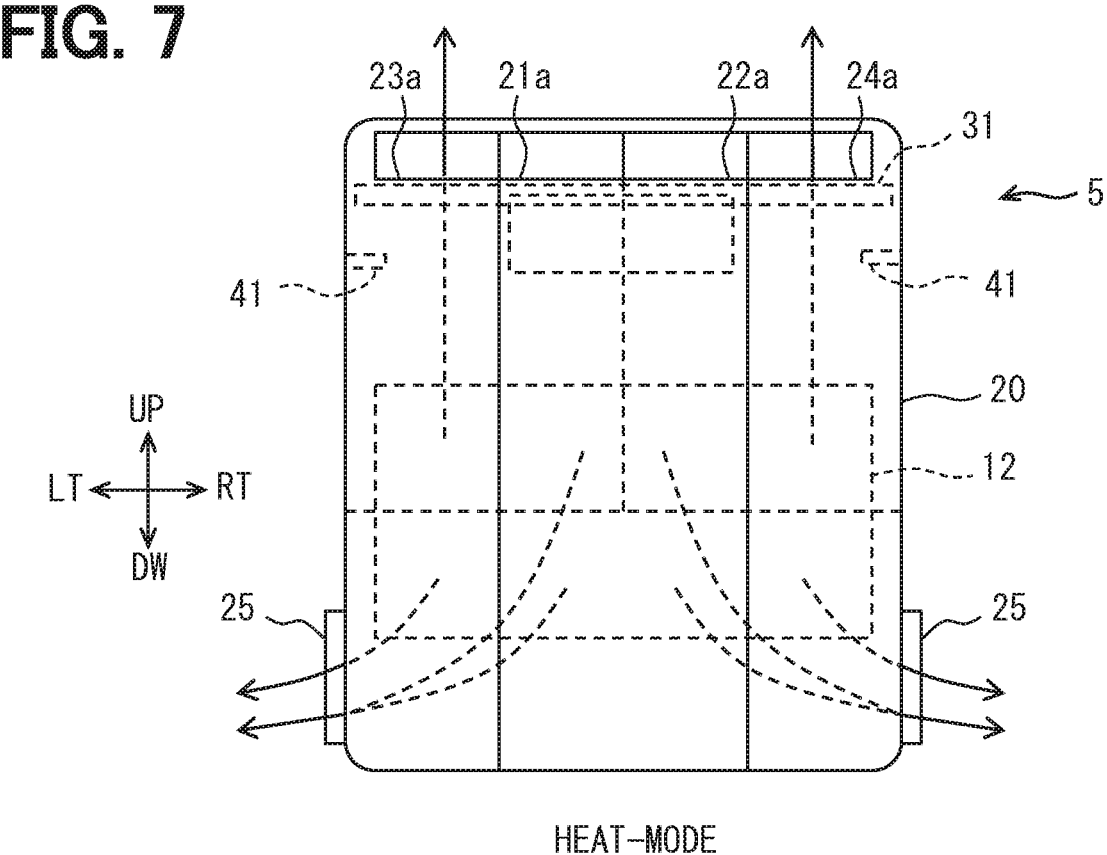
FIG. 7 is a front view showing the heat blowing mode.
Figure 8:
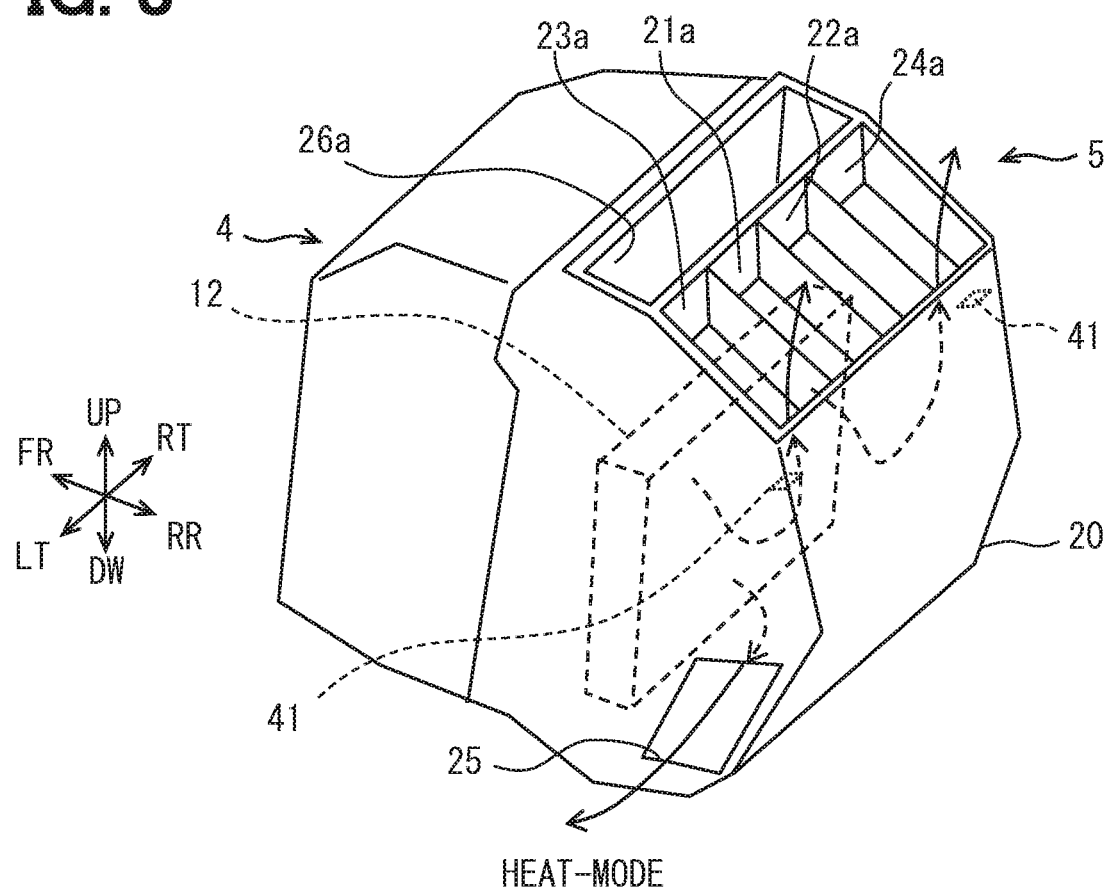
FIG. 8 is a perspective view showing the heat blowing mode.

FIG. 6, FIG. 7, and FIG. 8 show the heat mode. In these drawings, the air flow in the heat mode is indicated by arrows. In the heat mode, the lower unit provides warm air to the foot outlet 25. In the heat mode, the air whose temperature is adjusted by the temperature adjusting mechanism is mainly supplied to the compartment from the foot outlet 25.

In the heat mode, warm air is also supplied to the compartment from the side vent outlets 23 and 24 and the defrost outlet 26. In the heat mode, the upper unit supplies warm air to the side vent outlets 23 and 24 and the defrost outlet 26.

In the heat mode, the air flowing from the upper warm air passage 15 toward the connecting portions 23a and 24a for the side vent outlets 23 and 24 flows from the bottom to the top along the wall surface of the case 20. At this time, the vent door 31 is located along the wall surface of the case 20. For this reason, a large cross-sectional area for the air flowing from the upper warm air passage 15 to the connecting portions 23a and 24a is provided in the case 20. An area occupied by the fixed guide member 41 in this air passage is extremely small. Therefore, the fixed guide member 41 does not function as the guide surface. A ratio of an air flow resistance due to the fixed guide member 41 in an air flow resistance to the side vent outlets 23, 24 in the heat mode is small. The fixed guide member 41 hardly reduces the air volume in the heat mode.

Figure 9:
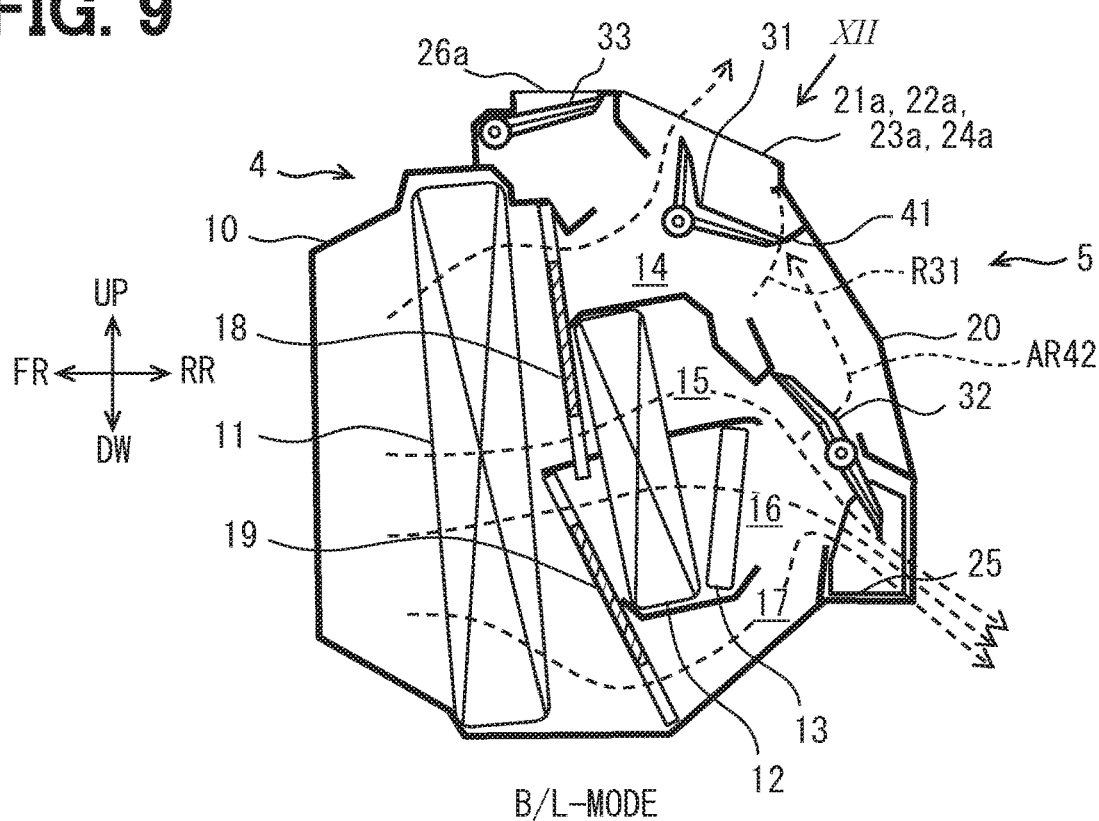
FIG. 9 is a cross-sectional view showing a bi-level blowing mode.
Figure 10:
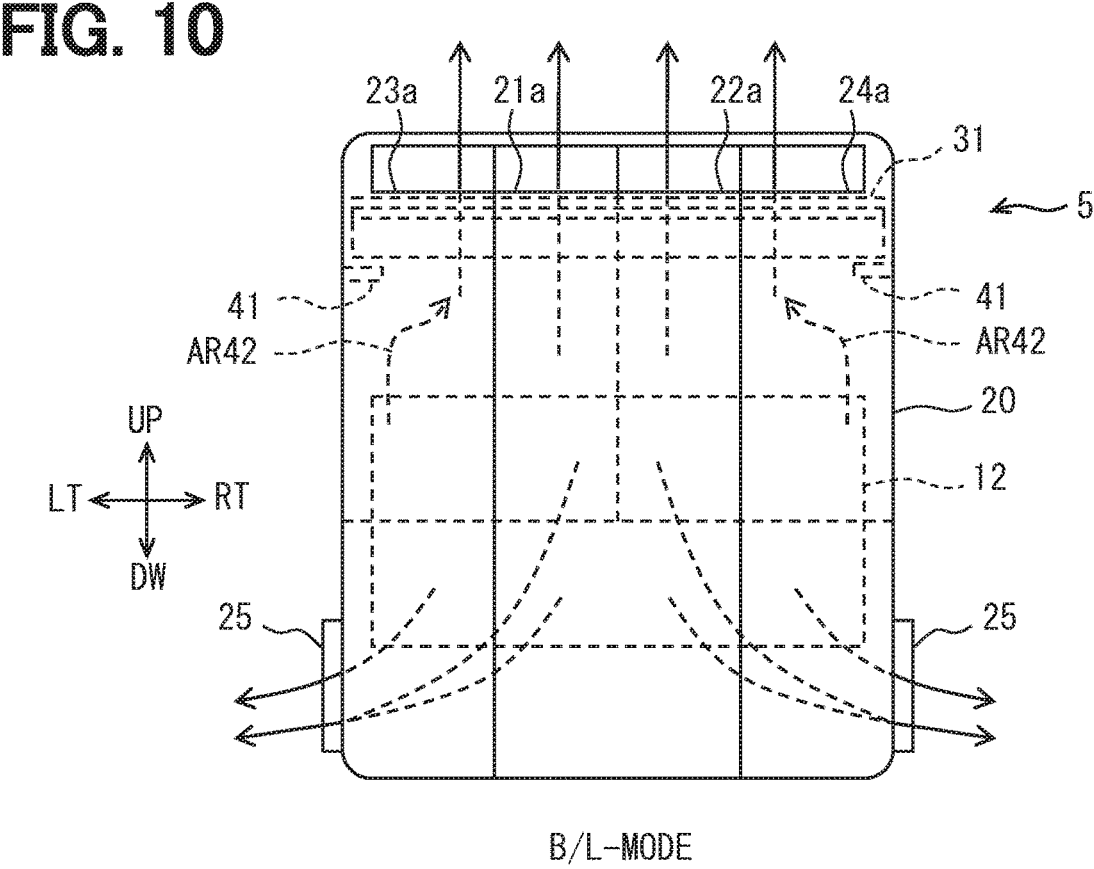
FIG. 10 is a front view showing the bi-level blowing mode.
Figure 11:
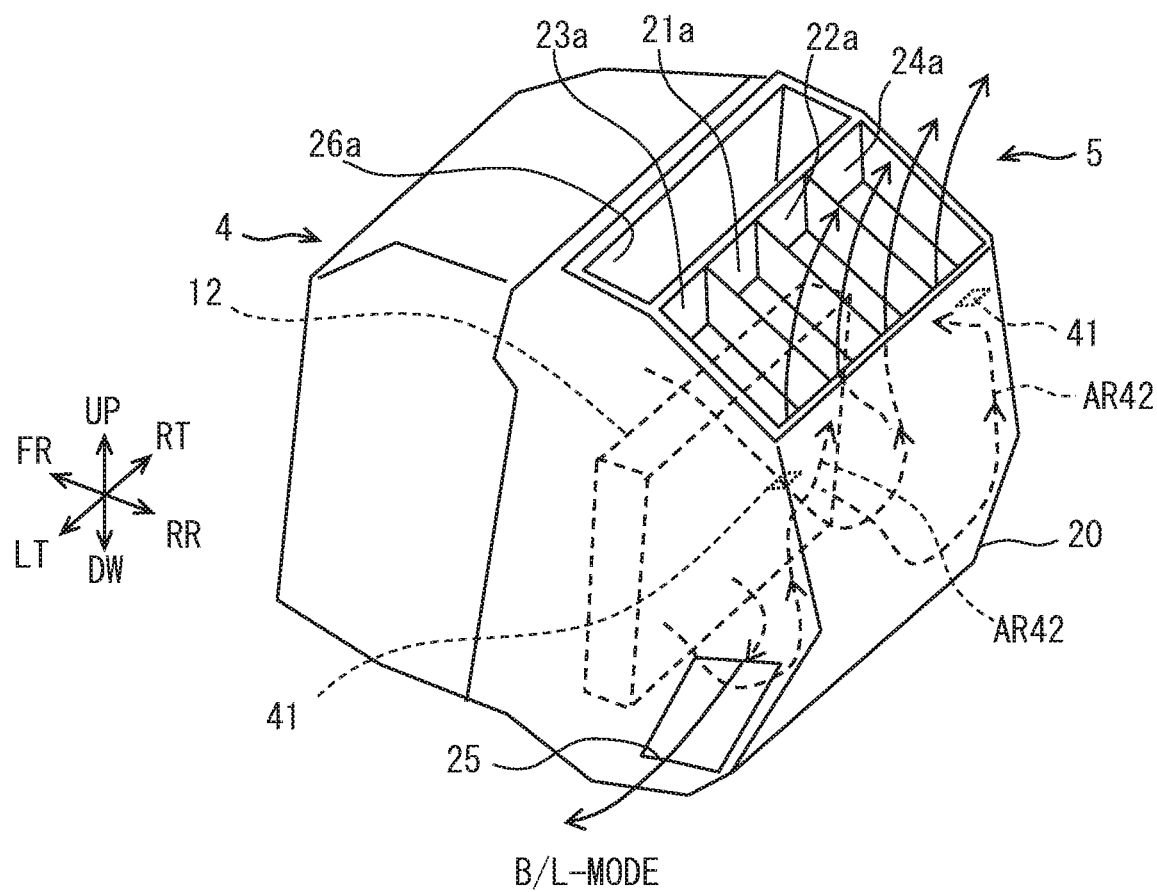
FIG. 11 is a perspective view showing the bi-level blowing mode.

FIG. 9, FIG. 10, and FIG. 11 show the bi-level mode. In these drawings, the air flow in the bi-level mode is indicated by arrows. In the bi-level mode, the upper cool air passage 14 mainly supplies the cool air to the vent connecting portions 21a, 22a, 23a, and 24a. In the bi-level mode, the upper warm air passage 15, the lower warm air passage 16, and the lower cool air passage 17 provide the temperature-adjusted warm air to the foot outlet 25. In the bi-level mode, the upper cool air passage 14 mainly supplies the cool air to the vent connecting portions 21a, 22a, 23a, and 24a.

Further, in the bi-level mode, a part of the air that has passed through the foot door 32 flows toward the connecting portions 23a and 24a for the side vent outlets 23 and 24. The airflow AR42 is a flow that passes through the corners of the case 20 and rises. In the bi-level mode, the vent door 31 and the fixed guide member 41 cooperate to form a substantially continuous barrier. Therefore, the air flow AR42 is deflected by the fixed guide member 41. In other words, the airflow AR42 bends toward the inside of the case 20. The fixed guide member 41 exhibits a function as the guide surface in the bi-level mode. As a result, the temperature difference of the air in the plurality of vent outlets 21, 22, 23, and 24 is suppressed. In particular, the tuning for adjusting the air temperature of the side vent outlets 23 and 24 to be high in the heat mode is alleviated by the inward flow generated by the fixed guide member 41.

Figure 12:
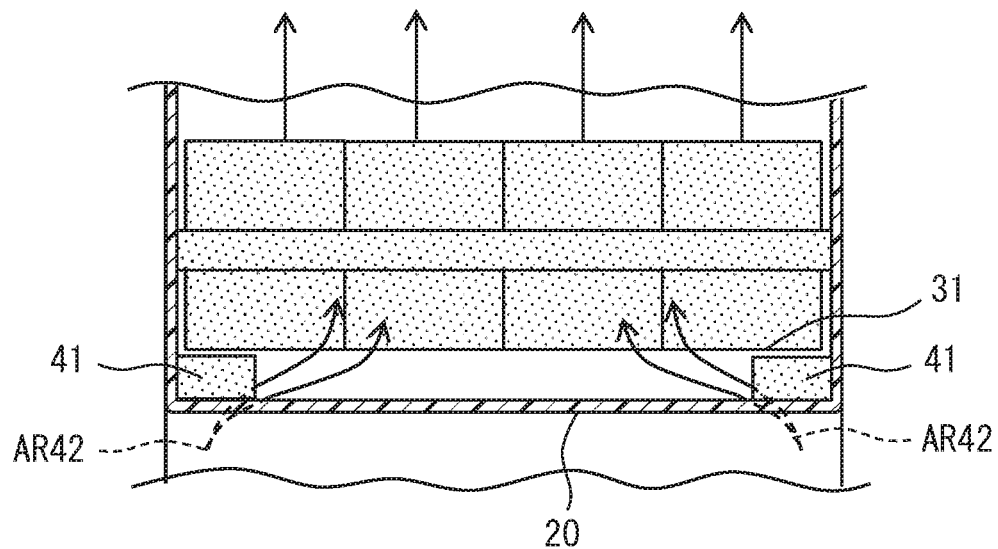
FIG. 12 is a cross-sectional view showing the bi-level blowing mode.

FIG. 12 is a schematic cross-sectional view showing a relationship between the vent door 31 and the fixed guide member 41 in the bi-level mode. FIG. 12 shows a cross section of the case 20 as seen from the direction of arrow XII in FIG. 9. In the bi-level mode, the vent door 31 approaches the case 20 and narrows the air passage from the bottom to the top. Further, the fixed guide member 41 closes the corners of the case 20. As a result, the airflow AR42 is deflected inward in the width direction RT, LT of the case 20. The inward airflow AR42 reduces the warm air flowing toward the side vent outlets 23 and 24. As a result, the air temperature of the side vent outlets 23 and 24 is lowered. The inward air flow AR42 increases the warm air toward the center vent outlets 21 and 22. As a result, the air temperature of the center vent outlets 21 and 22 is raised. Such adjustment in the bi-level mode, at least partially, and preferably substantially completely, disables the tuning that raises the air temperature of the side vent outlets 23 and 24 in the heat mode. Thereby, the temperature difference between the plurality of vent outlets 21, 22, 23, and 24 in the bi-level mode is suppressed.

Figure 13:
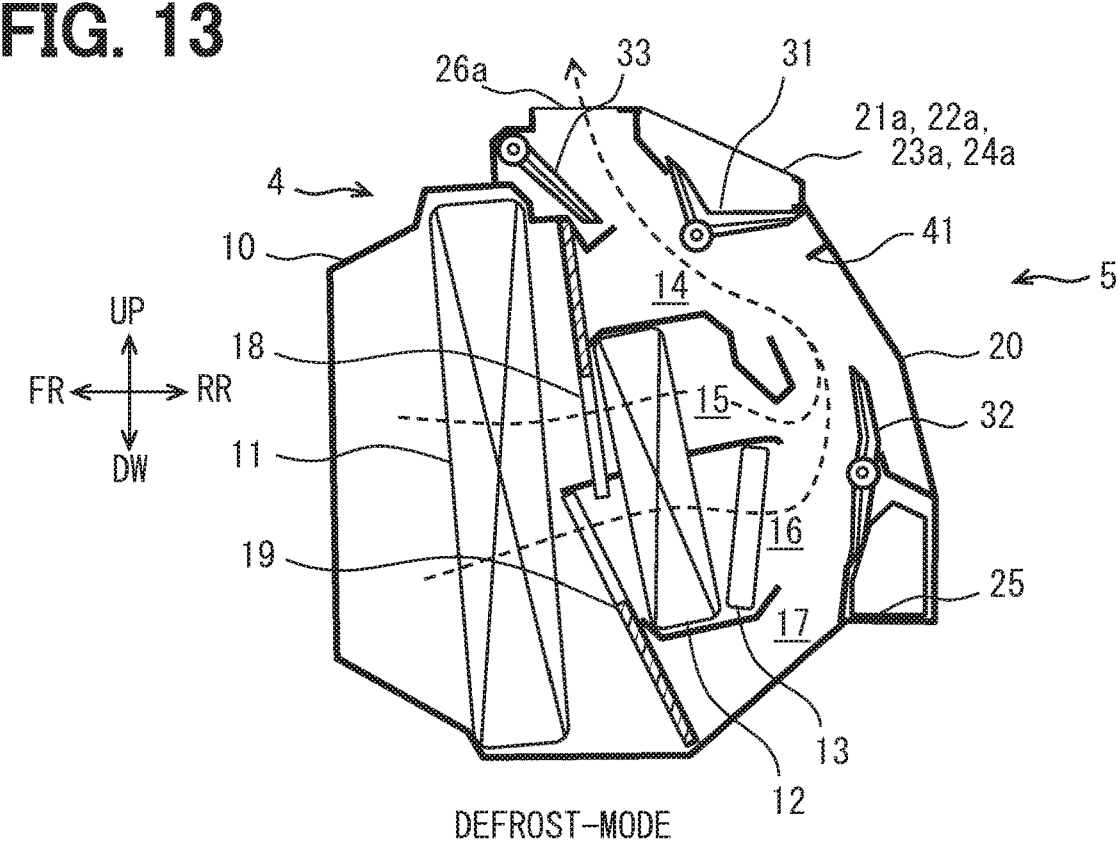
FIG. 13 is a cross-sectional view showing a defrost blowing mode.
Figure 14:
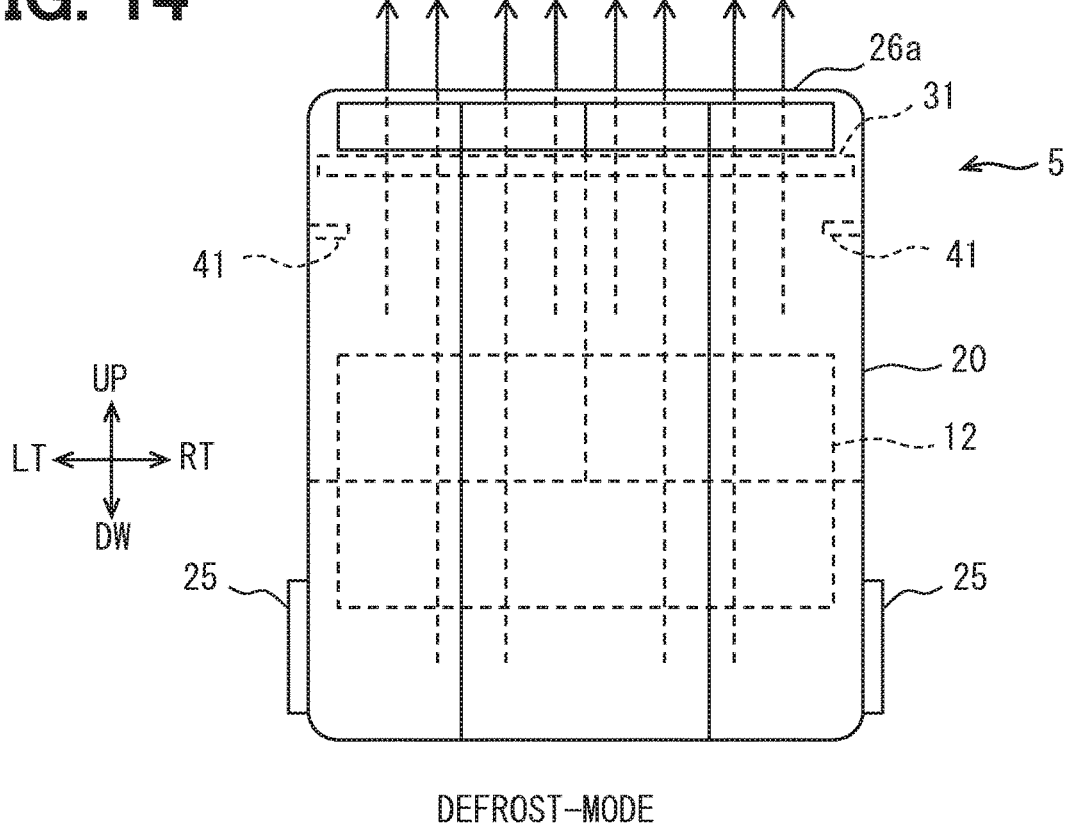
FIG. 14 is a front view showing the defrost blowing mode.
Figure 15:
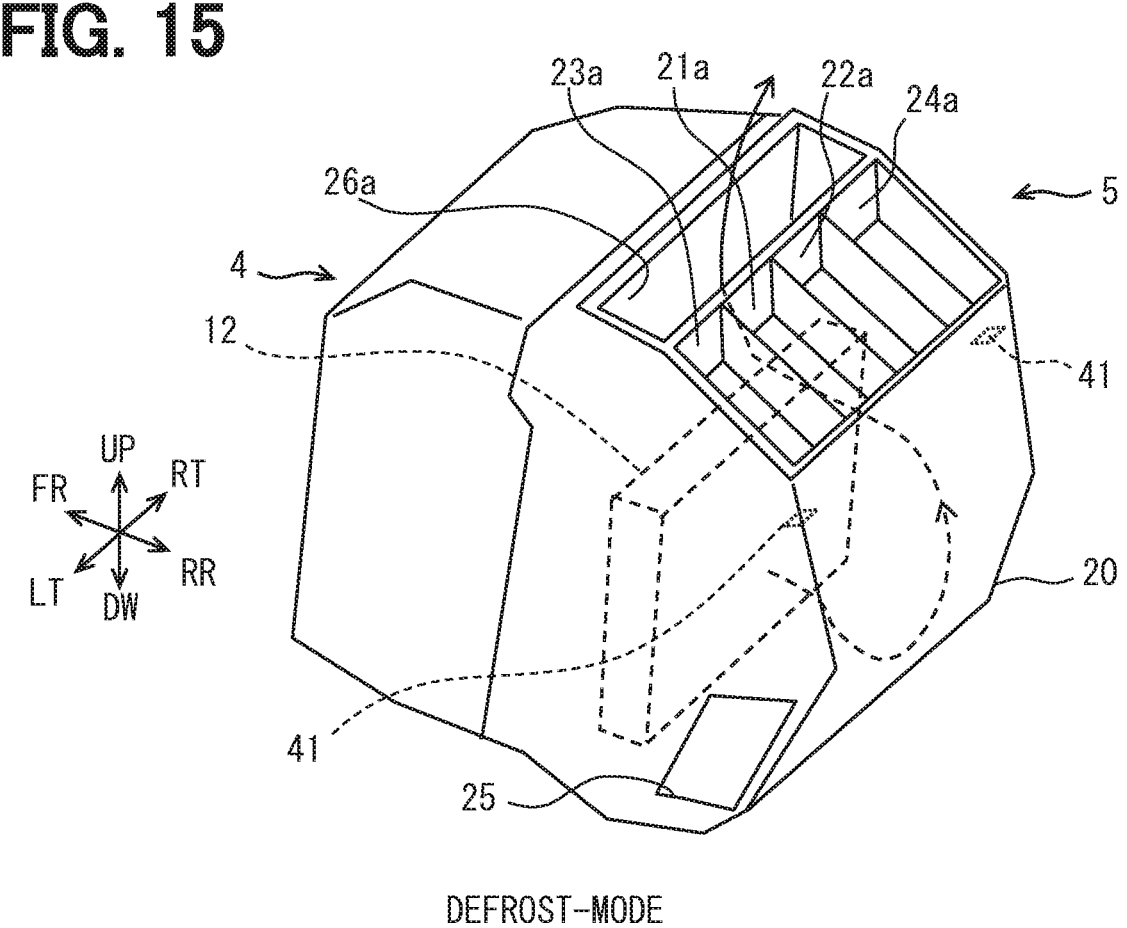
FIG. 15 is a perspective view showing the defrost blowing mode.

FIG. 13, FIG. 14, and FIG. 15 show the defrost mode. In the defrost mode, the upper warm air passage 15 and the lower warm air passage 16 provide warm air to the defrost connecting portion 26a. At this time, the fixed guide member 41 does not project to the air flow. As a result, the fixed guide member 41 does not reduce the air volume in the defrost mode.

According to the disclosed air-conditioning device for vehicle, the vent door 31 is capable of stopping at each of the face mode position, the heat mode position, and the bi-level mode position. In the heat mode, the air-conditioning device 1 supplies warm air from the foot outlet 25. In the heat mode, the air-conditioning device 1 closes the center vent outlets 21 and 22 and opens the side vent outlets 23 and 24. Thereby, the side vent outlets 23 and 24 are provided with warm air suitable for the left and right side window glasses. The case 20 and the vent door 31 and the like are designed and formed to supply a relatively high temperature warm air suitable for the side vent outlets 23 and 24.

On the other hand, in the bi-level mode, the air-conditioning device 1 supplies cool air from the center vent outlets 21 and 22 and the side vent outlets 23 and 24, and supplies hot air from the foot outlet 25. In the bi-level mode, the air-conditioning device 1 opens the center vent outlets 21 and 22 and the side vent outlets 23 and 24. At this time, the vent door 31 is positioned at the bi-level position facing the fixed guide member 41. Therefore, the fixed guide member 41 controls the air flow in the case 20 together with the vent door 31 so as to suppress the difference between the temperature of the air supplied from the center vent outlets 21 and 22 and the temperature of the air supplied from the side vent outlets 23 and 24.

The fixed guide member 41 controls the air flow in the case 20 only in the bi-level mode so as to resist a characteristic in the heat mode in which the temperature of the air supplied from the side vent outlets 23 and 24 is adjusted to be high. As a result, in the bi-level mode, the temperature difference between the air temperature from the center vent outlets 21 and 22 and the air temperature from the side vent outlets 23 and 24 is suppressed.

OTHER EMBODIMENTS

The disclosure in this specification, the drawings, and the like is not limited to the illustrated embodiments. The disclosure encompasses the illustrated embodiments and variations thereof by those skilled in the art. For example, the present disclosure is not limited to the combinations of components and/or elements shown in the embodiments. The present disclosure may be implemented in various combinations. The present disclosure may have additional portions which may be added to the embodiments. The present disclosure encompasses omission of the components and/or elements of the embodiments. The present disclosure encompasses the replacement or combination of components and/or elements between one embodiment and another. The disclosed technical scope is not limited to the description of the embodiment. Several technical scopes disclosed are indicated by descriptions in the claims and should be understood to include all modifications within the meaning and scope equivalent to the descriptions in the claims.

In the above embodiment, the fixed guide member 41 is provided by a small piece that protrudes inward of the case 20. Alternatively, the fixed guide member 41 may be provided by a concave portion and/or a convex portion of the case 20. For example, the guide surface may be provided by a protrusion protruding from the inner surface of the case 20 toward the inside of the case 20. Also in this case, when the vent door 31 is in the bi-level mode position, the fixed guide member 41 guides the flow inwardly toward the vent connecting portions 21a, 22a, 23a, and 24a.

What is claimed is:

1. An air-conditioning device for vehicle, comprising:
   a case which provides a center vent outlet for supplying air to an upper center of a compartment to be air-conditioned, a side vent outlet for supplying air to a left and right side portions of the compartment, and a foot outlet for supplying air to a lower part of the compartment;
   a temperature adjusting unit including a cooling heat exchanger and a heating heat exchanger for adjusting a temperature of the air supplied from the case to the compartment;
   an outlet unit providing a plurality of modes by adjusting opening degrees of the center vent outlet, the side vent outlet, and the foot outlet; and
   a control device which controls the outlet unit, wherein
   the outlet unit includes a vent door which is capable of stopping at a face mode position where the center vent outlet and the side vent outlet are opened, a bi-level mode position where the center vent outlet and the side vent outlet are opened, and a heat mode position where the center vent outlet is closed and the side vent outlet is open, and is capable of moving over between the face mode position and the heat mode position through the bi-level mode position, and wherein
   the case has a fixed guide member which controls an air flow in the case in the bi-level mode position so as to suppress a difference between a temperature of air supplied from the center vent outlet and a temperature of air supplied from the side vent outlet by opposing to the vent door positioned at the bi-level mode position.

2. The air-conditioning device for vehicle claimed in claim 1, wherein
   the fixed guide member is a plate-shaped member protruding from an inner surface of the case.

3. The air-conditioning device for vehicle claimed in claim 1, wherein
   the case has a box-shaped outer shape having the center vent outlet and the side vent outlet on an upper part and the foot outlet on a lower part, and wherein
   the fixed guide member is arranged at each of two corners in a width direction of the case.

4. The air-conditioning device for vehicle claimed in claim 1, wherein
   the center vent outlet and the side vent outlet are arranged along a width direction of the case, and wherein
   the side vent outlet includes two side vent outlets, one positioned on each side of the center vent outlet, and wherein
   the fixed guide member generates an air flow in the case in the width direction.

5. The air-conditioning device for vehicle claimed in claim 1 wherein
the fixed guide member promotes mixing of air in the case in the bi-level mode.

6. The air-conditioning device for vehicle claimed in claim 5, wherein
the fixed guide member promotes mixing of air toward the center vent outlet and air toward the side vent outlet in the case.

7. The air-conditioning device for vehicle claimed in claim 1 wherein
the outlet unit is capable of providing a face mode in which cool air is supplied from the center vent outlet and the side vent outlet, a heat mode in which warm air is supplied from the foot outlet and the side vent outlet, and a bi-level mode in which cool air is supplied from the center vent outlet and the side vent outlet and warm air is supplied from the foot outlet.

8. The air-conditioning device for vehicle claimed in claim 1 wherein
the case has a defrost outlet for supplying air toward an inner surface of a windshield, and wherein
the vent door is capable of stopping at a defrost mode position where the center vent outlet and the side vent outlet are closed.

9. The air-conditioning device for vehicle claimed in claim 1 wherein
the outlet unit has a foot door that opens and closes the foot outlet.

10. The air-conditioning device for vehicle claimed in claim 1, wherein
the temperature adjusting unit has an upper unit arranged in an upper portion and a lower unit arranged below the upper unit, and wherein
the upper unit includes: an upper cool air passage which passes cool air passed through the cooling heat exchanger; and an upper warm air passage which passes warm air passed through the heating heat exchanger after passing through the cooling heat exchanger, and wherein
the lower unit includes: a lower cool air passage which passes cool air passed through the cooling heat exchanger; and a lower warm air passage which passes warm air passed through the heating heat exchanger after passing through the cooling heat exchanger, and wherein
the outlet unit provides:
a heat mode by communicating the upper unit with the side vent outlet and communicating the lower unit with the foot outlet; and
a bi-level mode by communicating the upper cool air passage with the center vent outlet and the side vent outlet, and by communicating the upper warm air passage, the lower warm air passage, and the lower cool air passage with the foot outlet, wherein
a part of the air supplied to the foot outlet is supplied to the center vent outlet and the side vent outlet, along a wall surface of the case through the fixed guide member, in the bi-level mode.

* * * * *